United States Patent [19]

Agrawal et al.

[11] Patent Number: 5,761,091
[45] Date of Patent: Jun. 2, 1998

[54] METHOD AND SYSTEM FOR REDUCING THE ERRORS IN THE MEASUREMENTS OF RESOURCE USAGE IN COMPUTER SYSTEM PROCESSES AND ANALYZING PROCESS DATA WITH SUBSYSTEM DATA

[75] Inventors: Subhash C. Agrawal, Lincoln; Kenneth Newman, Cambridge; Carol Rathrock, Lexington, all of Mass.

[73] Assignee: BGS Systems, Inc., Waltham, Mass.

[21] Appl. No.: 763,187

[22] Filed: Dec. 10, 1996

[51] Int. Cl.⁶ .................................................. G01B 17/00
[52] U.S. Cl. .................... 364/551.01; 364/550; 395/674
[58] Field of Search ...................... 364/550, 551.01, 364/569; 395/183.14, 184.01, 180, 200.54, 200.55, 200.56, 670, 672, 673, 674

[56] References Cited

U.S. PATENT DOCUMENTS

| | | | |
|---|---|---|---|
| 3,818,458 | 6/1974 | Deese | 340/172.5 |
| 5,072,376 | 12/1991 | Ellsworth | 395/650 |
| 5,355,501 | 10/1994 | Gross et al. | 395/750 |
| 5,499,340 | 3/1996 | Barritz | 395/184.01 |
| 5,560,011 | 9/1996 | Uyama | 395/700 |
| 5,590,056 | 12/1996 | Barritz | 364/550 |

*Primary Examiner*—James P. Trammell
*Attorney, Agent, or Firm*—Rines and Rines

[57] ABSTRACT

A novel method of and system and procedures for more accurately measuring the resource usage of UNIX processes by sampling methods involving appropriate corrections for the resource usage of the terminated processes and analyzing UNIX process data along with subsystem data such as RDBMSs, allowing system administrators and mangers to get a much better picture of who is using the resources on the system and thus perform a better job at performance analysis and capacity planning, the technique also enabling and reducing the error in the process measurements collected by sampling of the resources usage measured by the operating system and correlating the measurements taken by subsystems with the measurements taken by the operating system.

20 Claims, 9 Drawing Sheets

BASIC SYSTEM & PROCESS DATA ANALYSIS METHOD

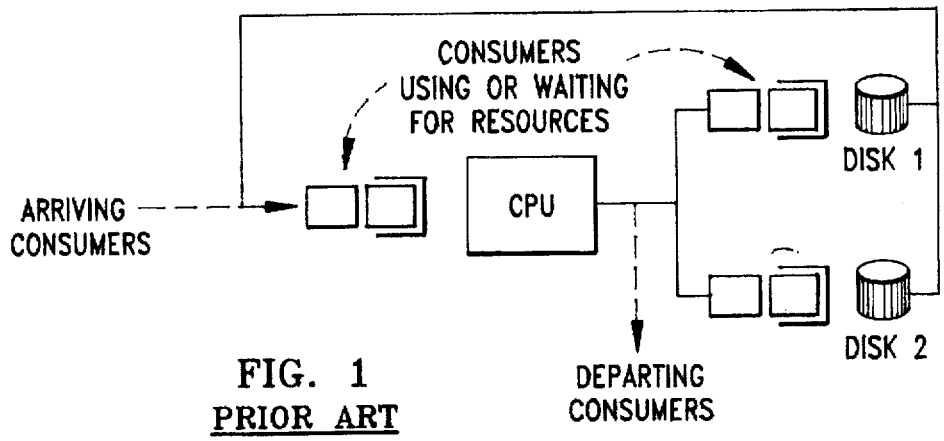

FIG. 1
PRIOR ART

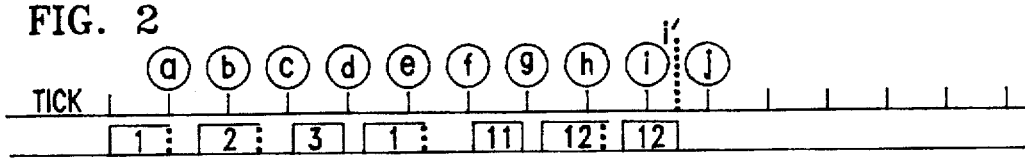

FIG. 2

(a) CPU BUSY-WHOLE TICK CHARGED TO PROCESS 1

(b) CPU BUSY-WHOLE TICK CHARGED TO PROCESS 2

(c) CPU SEEN IDLE-CPU USED BY PROCESS 2 BETWEEN TICKS (b)&(c) IS NOT CHARGED TO ANY PROCESS (d) CPU SEEN IDLE-CPU USE BY PROCESS 3 LOST (e) CPU SEEN BUSY-WHOLE TICK IS CHARGED TO PROCESS 1

(f) CPU IDLE-CPU USED BY PROCESS 1 BETWEEN (e)&(f) NOT SEEN (g) CPU IDLE-CPU USED BY NEW PROCESS 11, A CHILD OF PROCESS 1 IS NOT MEASURED AT ALL (h) CPU SEEN BUSY-WHOLE TICK CHARGED TO PROCESS 12, CHILD OF PROCESS 1

(i) CPU SEEN BUSY-WHOLE TICK IS CHARGED TO PROCESS 12 IN USE (i') PROCESS 12 TERMINATES. ITS CPU IS CHARGED TO CHILDREN FIELD OF PROCESS 1.

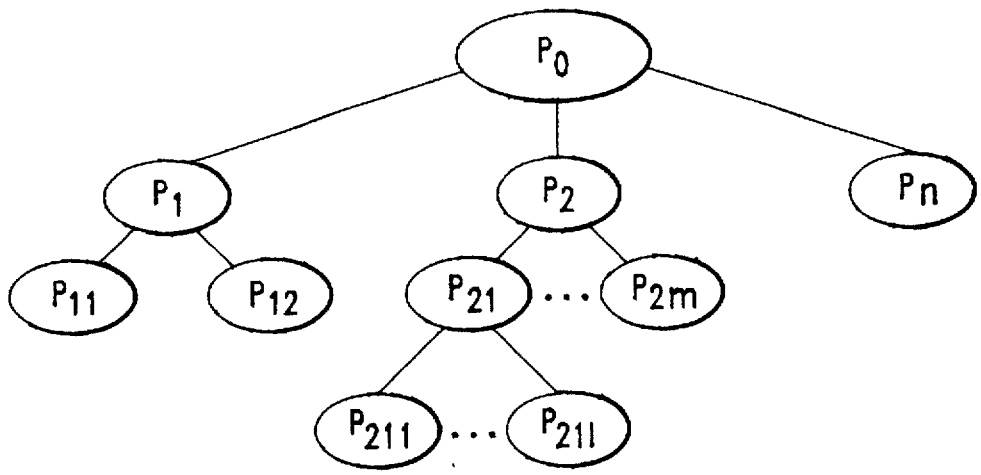

Pabcd  DENOTES A PROCESS. PROCESSES LOWER IN THE HIERARCHY ARE OFFSPRINGS OF THE PROCESSES HIGHER IN THE HIERARCHY.

Pabcd  DENOTES THE NAME OF THE PROCESS.

CONSUMER/PROCESS HIERARCHY

FIG. 3

- PROCESS IDENTIFIER
- PROCESS'S PARENT IDENTIFIER
- PROCESS NAME
- LONG OR FULL COMMAND NAME
- USER NAME
- ACCOUNT NAME
- CPU USED BY PROCESS
- CPU USED BY TERMINATED CHILDREN OF THE PROCESS
- START TIME OF THE PROCESS
- TERMINATION TIME OF THE PROCESS

SOME PROCESS ATTRIBUTES/METRICS

FIG. 4

BASIC SYSTEM DATA COLLECTION METHOD

REFINED SYSTEM & PROCESS ANALYSIS METHOD

PROCESSES & SUBSYSTEMS: AN ORACLE EXAMPLE

METHOD FOR COLLECTING DATA FOR
SUBSYSTEMS SUCH AS ORACLE

FIG. 10

STEP 1: ADJUST CPU UTILIZATION FOR INSTANCE PROCESSES
- COMPUTE OVERALL CAPTURE RATIO CR
- SELECT PROCESS RECORDS ASSOCIATED WITH THE SUBSYSTEM INSTANCE
- SUM CPU UTILIZATION OF THESE PROCESS RECORDS
- A=INSTANCE PROCESS CPU UTILIZATION ADJUSTED BY THE CAPTURE RATIO

STEP 2: FIND SUBSYSTEM DATA
- SELECT APPROPRIATE SUBSYSTEM RECORDS FROM DATA FOR GIVEN INTERVAL

STEP 3: ADJUST SUBSYSTEM INSTANCE LEVEL UTILIZATION
- COMPUTE TOTAL CPU UTILIZATION 'B' FOR THE INSTANCE AS MEASURED BY THE SUBSYSTEM
- COMPUTE FIRST COMPONENT OF THE SUBSYSTEM OVERHEAD AS
  $OVHD1 = MIN(OVHD1\_CAP, A-B)$
  WHERE THE OVHD1_CAP CAN BE A FUNCTION OF TOTAL CPU UTILIZATION
- COMPUTE ADJUSTED INSTANCE CPU UTILIZATION
  $C = A - OVHD1$

STEP 4: ADJUST SUBSYSTEM SESSION LEVEL UTILIZATION USING INSTANCE LEVEL UTILIZATION
- COMPUTE SUM OF UTILIZATION FOR EACH SESSION
  $D = \Sigma\ SESSION\_CPU\_UTILIZATION$
- COMPUTE SECOND COMPONENT OF THE SUBSYSTEM OVERHEAD
  $OVHD2 = MIN(OVHD2\_CAP, C-D)$
  WHERE OVHD2_CAP CAN BE A FUNCTION OF ADJUSTED INSTANCE CPU UTILIZATION
- ADJUST CPU UTILIZATION OF SESSIONS
  ADJUSTED_SESSION_CPU_UTILIZATION=
  $(C-OVHD2)/C *$ SESSION_CPU_UTILIZATION

STEP 5: COMPUTE OVERALL OVERHEAD WORKLOAD
TOTAL OVERHEAD UTILIZATION=OVHD1+OVHD2

STEP 6: COMPUTE SUBSYSTEM WORKLOAD UTILIZATION
- GROUP SESSIONS INTO WORKLOADS ON THE BASIS OF THER DB NAME OR USER NAME OR APPLICATION NAME
- COMPUTE CPU UTILIZATION FOR EACH WORKLOAD BY SUMMING ADJUSTED SESSION CPU UTILIZATION

METHOD FOR COMPUTING COMPONENT RESOURCES FOR SUBSYSTEM SUCH AS ORACLE

METHOD AND SYSTEM FOR REDUCING THE ERRORS IN THE MEASUREMENTS OF RESOURCE USAGE IN COMPUTER SYSTEM PROCESSES AND ANALYZING PROCESS DATA WITH SUBSYSTEM DATA

The present invention relates to the measurement of the usage of resources such as central processing units (CPU), memory, hard disks, network bandwidth and the like by the process aid subsystems in a computer system. Such measurements and analyses are required for assuring satisfactory performance of the computer systems and are complicated by the short-cuts taken by operating systems and other entities in updating underlying variables—these short-cuts having been implemented either to reduce the cost of measurement or because measurement procedures were not given enough attention during development.

BACKGROUND

The CPU is one of the most important resources in computer systems. For performance analysis capacity planning, chargeback and accounting functions, it is important to measure correctly the over-all CPU utilization as well as utilization by each consumer or consumer group. While measurement tools have been perfected for and are well integrated into "mature" operating systems such as MVS, Open VMS and OS/400, because of its nature of evolution and open development, such has not been the case for UNIX and other similar systems. This is generally also the case when an operating system is relatively "young".

Operational computer systems employ tightly woven interaction between resources and consumers. As before stated, resources include the central processing unit (CPU), memory, hard disks, and network bandwidth. The term "consumers' is intended to embrace processes, transactions, applications and the ultimate user. When a consumer arrives at a resource or a server, it may have to wait for its turn for service, then receive service, and then go to another resource for additional service or depart from the system. One of the goals of the measurement tools is to measure (a) the overall utilization of various resources and (b) for each consumer, the amount of time it uses each of the resources.

While it is generally fairly easy to measure resource consumption on a system-wide basis, measurement of resource consumption on a consumer-by-consumer basis is much more difficult and resource intensive. Information on resource use by the consumer is needed for (a) relating the resource use to actual need (by whom, for what purpose or application) and for many performance tuning actions, e.g. reducing the priority or rate of resource consumption for less critical work.

Measuring computer performance has traditionally been more of an art than a science. Analysis must at some level rely on information received from the operating system. Brute force capturing of each interesting event and time-stamping it, generally uses too much resources and also distorts the measurements. In addition, when there is too much data, difficult choices have to be made on what to collect and analyze. More significantly, in many cases, the meaning of the data can be uncertain and ill-defined. And finally, there are often inherent biases in the data, as it is collected via procedures that skew the data in one direction or another.

The problem is even more complicated because of what is seen by the system as a consumer, may, in fact, involve working on behalf of several other consumers. For example, a database server process (a consumer of system resources) actually performs computations on behalf of several database users who connect to it by means of establishing separate, concurrent, sessions and sending transactions. In such a case, one often wishes to find out resources used by each of the applications or transactions or users, separately. This problem is made complex because the sum of the measurements of the resources used by the database server on behalf of its own consumers does not generally agree with the database server resource use as measured by the system.

It is therefore incumbent on system administrators to use the data with care and to have a systematic technique to resolve ambiguities and contradictions. It is to the provision of such a technique that the present invention is directed, so to provide a generic method that allows system administrators to combine data from many different interrelated sources to compute a statistically valid description of the system being studied. The invention, furthermore, will be described in connection with its illustrative application to UNIX systems, though, of course, being useable with other systems as well.

While CPU measurement techniques have been discussed in the literature for many years (*Ferrari, D., Computer Systems Performance Evolution*, Prentice Hall) there are inherently severe limitations in the traditional methods. As discussed by the present inventors in Agrawal, S. et al., "Measurement and is Analysis of Process and Workload CPU Utilization in Unix Environments" (to be published in Proceedings of CMG96), there are two basic methods to obtain system information: event-driven collection and sampling. In event-driven collection, the operating system alerts the collecting tool that a significant event (such as process creation, process running, etc.) has occurred. The tool can then query the system as to the nature of the event and update its tables. The major limitation of this technique is that generally there are so mainly significant events that one generates more information than can be handled; and there is a danger that the collection tool itself will dominate the resources of the system.

On the other hand, a tool that uses the sampling technique, periodically queries the operating system about its current state and that of all processes. This technique has the promise of using considerably feaster resources than an event-driven one. However, a difficult trade off must be made. If one samples too frequently, there will again be the problem of too much data and too much overhead used by the tool. If one samples too infrequently, on the other hand, then there is the potential that much essential information will be lost. We have shown, however, that one can measure overall CPU utilization with sufficient accuracy using sampling techniques even though the measurement of individual consumers or groups of consumers is measured less accurately, in accordance with the present invention.

While this is a useful approach, working well if all the samples taken by the system can be captured by the measurement tools, in reality, the system samples the processing at a frequency much greater than what can be recorded (typically every 1 to 10 milliseconds), and the measurement tool itself typically samples the measurements taken by the system at a slower frequency (every 10 seconds or so). This introduces the problems that a consumer or process may terminate between the successive of all of the processes taken by the measurement tools and thus its resource use between two such successive samples may be lost, and/or a consumer or process may be created and terminated between the samples taken by the measurement tool.

Such errors affect the short-lived process much more than long-lived processes. One way to minimize this type of error is to sample much more frequently, but doing so increases the overhead of data collection.

The present invention addresses these shortconmings in the measurement and analysis of computer system performance data for such purposes as performance analysis, diagnosis, investigation, capacity planning, modeling, and trending. In short, it assists in all forms of computer and application performance management.

The invention achieves its improved results by enhanced data collection that captures additional information during data collection and essentially recreates data that is lost between samples and thus allows the collection of data by sampling relatively infrequently, but delivering a better quality of the data. This is done by an analysis technique for such data that provides a truer picture of resource usage. Further, the integrated analysis techniques of the invention, allow one to combine data from UNIX as well as its subsystems to get a truer picture of resource usage than can be obtained by using data from one source only.

OBJECTS OF INVENTION

An object of the present invention, accordingly, is to provide a new and improved method of and system for reducing errors in the measurement of resource usage by computer system processes, and analyzing process data with subsystem data, thereby obviating or improving upon the above-described limitations of prior techniques.

A further object is to provide a novel and systematic method that can be used to analyze and reduce errors in measurements that occur when one measures different aspects of the same combined system from different tools or vantage points.

Other and further objects will be explained hereinafter and are more particularly delineated in the appended claims.

SUMMARY

In summary, from one of its important aspects, the invention embraces a method of reducing errors in the measurement of the usage of resources such as CPU's by computer system processes, for such purposes as performance analysis and planning, that comprises, measuring the resources usage by the operating system processes of the computer system by periodically sampling the CPU(s) to determine whether idle or apparently busy, and if busy, with which process; correcting the measurement of resource usage of terminated processes; measuring the resource usage by one or more process-implemented subsystems of the computer system by periodic sampling; and correlating the measurement taken by the subsystems with those taken by the operating system as corrected.

Preferred and best mode techniques and measurement system design are hereinafter more fully presented.

DRAWINGS

The invention will now be described with reference to the accompanying drawings, in which FIG. I is a general queuing representation of a computer system consisting of resources and consumers.

FIG. 2 illustrates tick-based sampling by the kernel to measure the overall CPU utilization and assign it to individual processes.

FIG. 3 explains the parent-child, and, in general, ancestor-descendent, relationship of various consumers.

FIG. 4 is a listing of some of the attributes or metrics that can be collected for a consumer.

Figure 11:
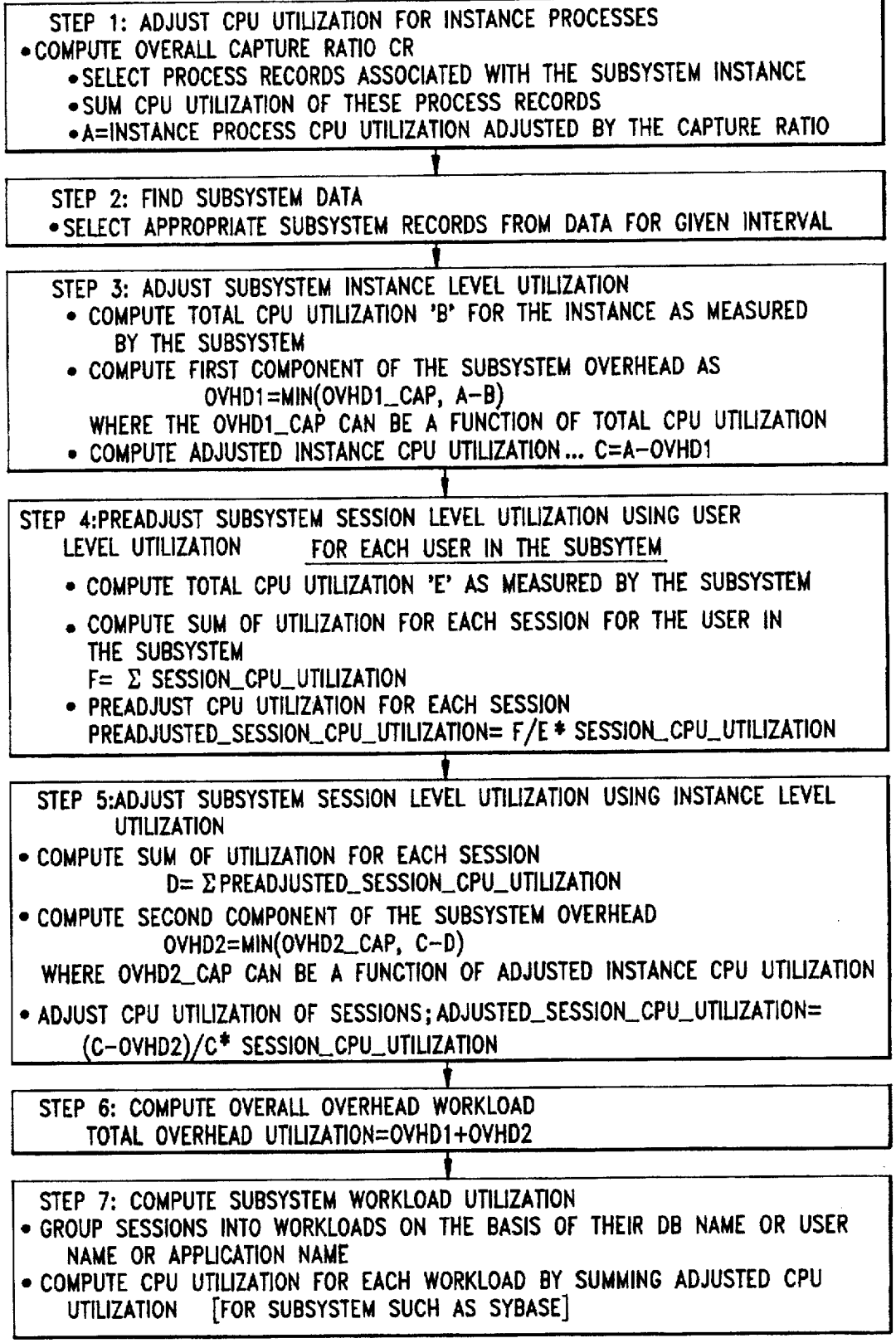

FIG. 10 illustrates a method for computing the resource usage by the workloads and sessions defined within subsystems in accordance with the invention. Using Oracle subsystem as an example, this figure illustrates how to analyze the subsystem data when there are two levels of data available from the subsystem. The two levels in this case are the database instance tools and the totals for individual sessions; and FIG. 11 illustrates a further modification to the method for computing the resource usage by the workloads and sessions defined within subsystems in accordance with the invention. Using Sybase subsystem as an example, this figure illustrates how to analyze the subsystem data when there are three levels of data available from the subsystem. The three levels in this case are the database instance totals, individual RDBMS user totals and the totals for individual sessions.

DESCRIPTION OF PREFERRED EMBODIMENT(S) OF INVENTION

As before stated, the invention will be described in illustrative context of UNIX system performance analysis and workload characterization, the performance analysis of subsystems such as database management systems and transaction processing systems running under UNIX (e.g., Oracle, Sybase), and the general procedures for dealing with error reductions when the measurements are taken at different levels.

UNIX PERFORMANCE ANALYSIS PROCESS DATA COLLECTION

In FIG. 1, a simplified generic view is presented of a computer system with many consumers arriving and receiving service from CPU resources.

On a machine running the UNIX operating system, there is a large number of processes running that carry out the various demands made on the machine by its users. UNIX "measures" overall CPU utilization for the system and the processes by "sampling the CPU" on every tick (typically every 10 milliseconds) to see if it is busy, and if so, by which process. FIG. 2 illustrates this tick-based sampling, representing successive CUP "idle" and "seen busy" events. These events may occur during the execution of different processes.

These are many common tools available in UNIX to report on the CPU utilization and other statistics. These utilities including commands such as sar, accounting, ps, iostat vmstat. Due to the limitations and overhead of these tools, these tools do not provide a complete and consistent picture of the system. In addition, unfortunately, significant variations exist in the operation and availability of these commands on different UNIX variants and the actual meaning of the measurements these utilities present. These utilities were designed as stand alone tools; each one was designed to address the problem that the utility designer was trying to solve at the time of its design. The procedure for underlying measurement is not well documented and supported. The outputs of these utilities have varied from release to release and from UNIX variant to variant. As a result, it takes a large amount of effort correctly to collect, understand and interpret UNIX performance data in consistent ways.

The present invention provides a collection tool to overcome these limitations. Without modifying the UNIX kernel, this tool samples the data collected by UNIX in its kernel data structures. Such sampling, however, suffers from the error that if a process is terminated between such samples, information on the resource use since the last sample will be lost—errors that the invention overcomes.

The processes within a UNIX system can be thought of being arranged as a tree; that is every process except "init" has a parent process. New processes are "forked" off of current processes. We will call the forking process the "parent" and the "forked off" process the "child". FIG. 3 illustrates this tree or hierarchy of processes Pa, b, c, d, where a, b, c, d are hierarchical numerals.

In Unix when a process dies (terminates), the operating system normally places the resources it used in the "child" resource usage data structure associated with the parent process. FIG. 4 shows some typical process attributes or metrics collected. The technique uses the information in the child resource usage data structure to recover the information about the terminated processes. Prior data collection methods developed over the last 15–20 years, ignore this child resource information. Use of this information) requires complex, novel methods due to several problems and complexities, including: 1) each process has only one structure to record the activity of its terminated children, so if more than one child process has terminated it is not always possible to precisely determine which resources which child had used; 2) it can frequently happen that during the same interval that a process dies, its parent dies, also, and sometimes even the grandparent will have died—and once a process is dead, the structures containing information about it are no longer available; 3 ) not every dying process will send its resource information to its parent; and 4 ) because of the sequential nature of sampling, it can happen that the information that a parent reports about its dead children can include information that the tool has not recognized is dead. This can happen when a process dies between the time that its information is recorded and the time that its parent's information is recorded.

In accordance with the invention, these problems are addressed as follows.

Each sample period, the current utilization numbers are collected from the operating system for each process. Whenever it is observed that a process that was running during the previous sample period is not running now, we look at the information that was deposited with the parent structure. The structures in the parent will generally have been incremented by the amount of the resources used by the process that has just terminated, plus all other processes that were terminated during the last sample interval that were forked by this process, plus the resources used by processes forked by the terminated processes.

This incremented number is compared to the amount that the processes themselves reported that they used. If the parent's records shows that more was used than was known from the terminated processes, the recorded resources used by the terminated processes are modified by the extra account. If there is more than one terminated process with the same parent, in the same sample interval, the extra amount is evenly distributed among them.

Unfortunately, it is not possible to obtain the records of all the processes at exactly the same time. And during the time that the collection is taking place, other activity is continuing on the machine being monitored. Thus, it is possible for the following sequence of events to occur: a) information from Process A is collected, b) Process A dies, c) information from Process B, Process A's parent, is collected. When this information is analyzed, Process A will not appear to have been terminated yet. However, its data will have been added to the Process B data. This anomaly can end up incorrectly distributing resources to other children of Process B that might have terminated during the same interval. This situation is handled by looking at the data collected during the next sample interval. It is at this time that it will be recognized that Process A has died. If it is also noticed that Process B information about its children has not made a comparable jump, but it made such a jump in the previous interval, the adjustments made in the previous interval are undone.

This algorithmic approach has been found to lead to highly reliable results.

ANALYSIS OF DATA: POST-PROCESSING TO RECONCILE SYSTEM & PROCESS DATA AND COMPUTE RESOURCE UTILIZATION BY GROUPS OF PROCESSES OR WORKLOADS

Figure 5:
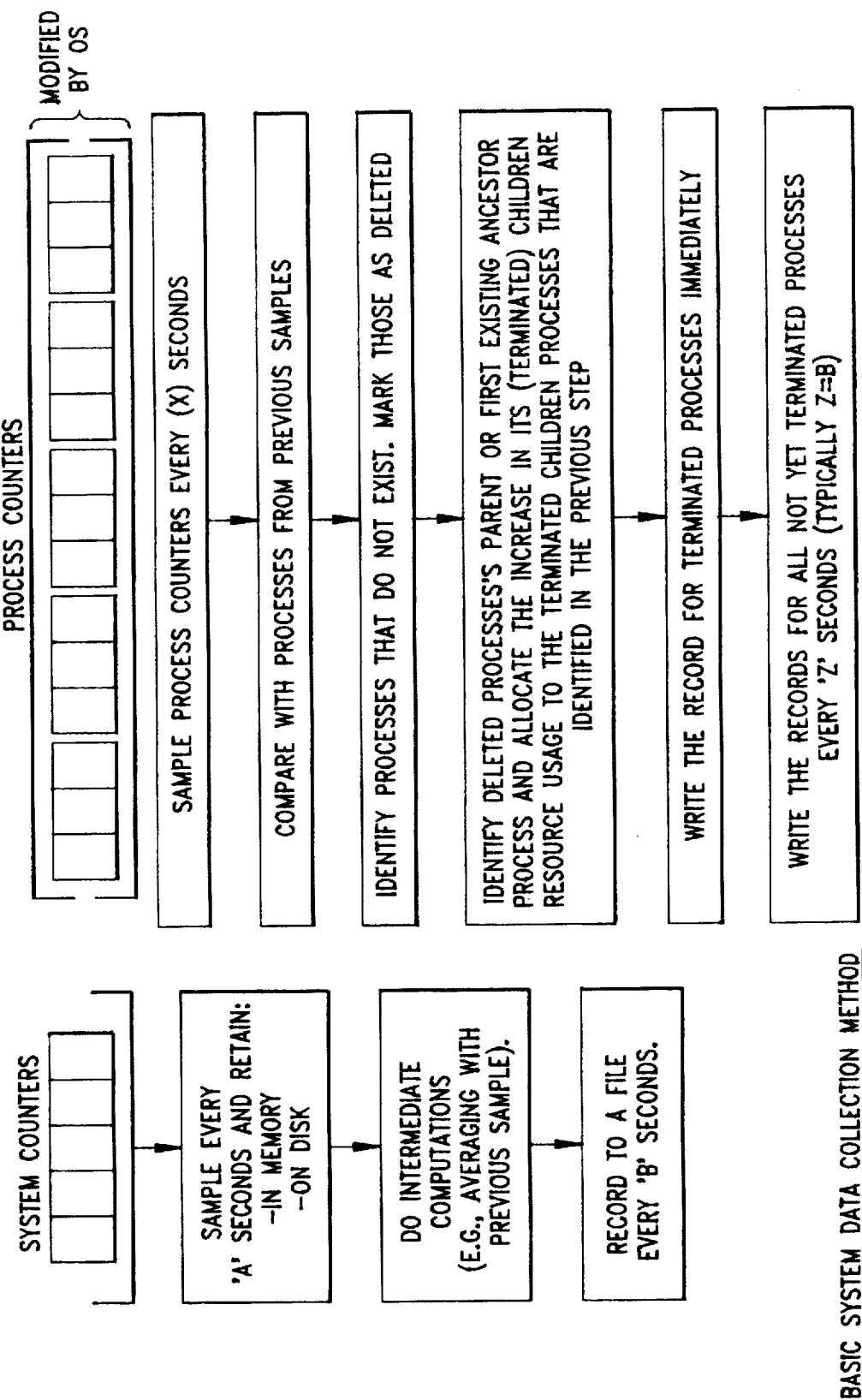
FIG. 5 illustrates the basic data collection method outlining the core steps of the invention, i.e. enhanced data collection method.

The above method generally results in a process capture ratio being equal to 1.0. In order to guard against the case when it is not, in a post-processing step, the capture ratio is computed and the process resource usage time corrected as shown in the flow chart steps of FIG. 6. In the basic data collection method of FIG. 5, the system and process-counters, so-labeled, enable sampling—averaging with previous samples—and recording for the system counter flow, and sampling—previous sample comparison—allocating resource usage increase re deleted processes—and recording, for the process sampling. In this figure, X and Z are the parameters that can be used to fine tune analysis and correction.

Figure 6:
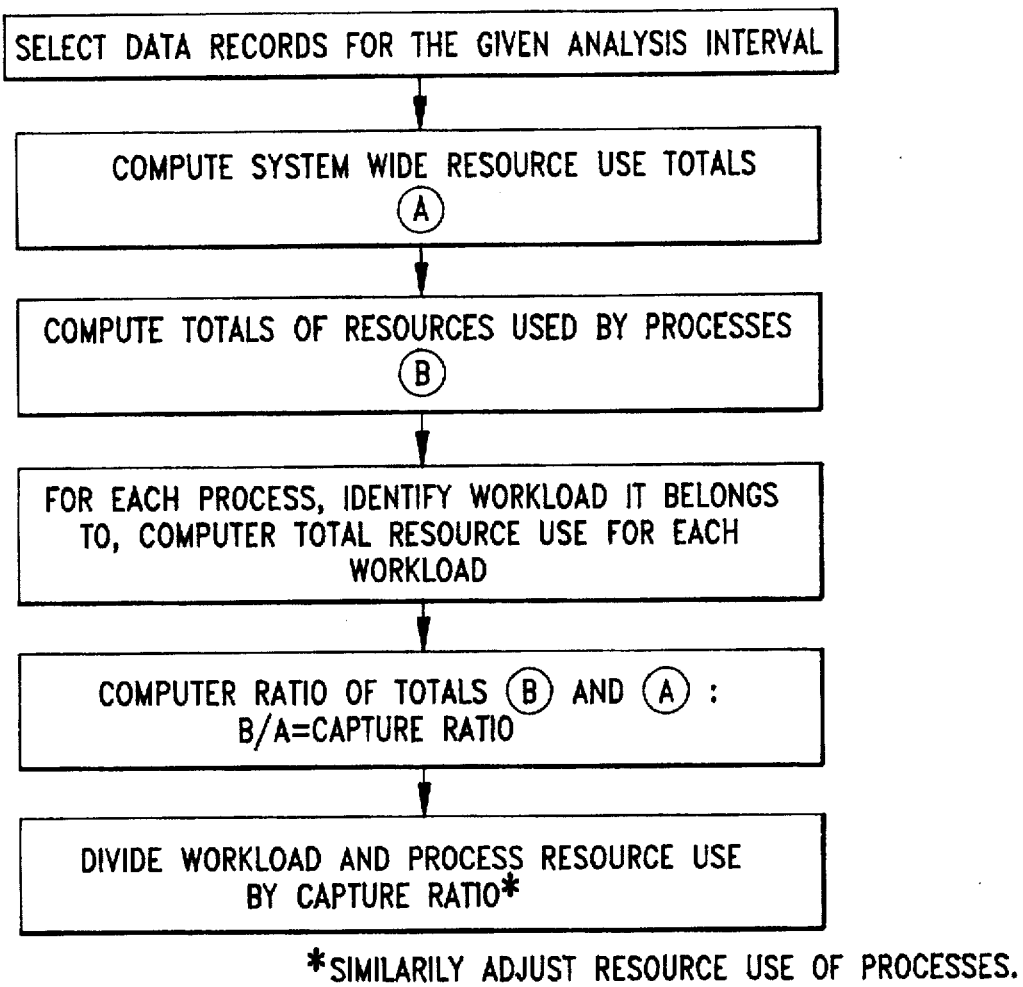
FIG. 6 shows the basic analysis method for analyzing UNIX system-wide and process specific data, in which processes are grouped into appropriate workloads and resource usage for both processes and workloads is adjusted for the capture ratio.

In FIG. 6, A and B refer to the totals that are computed in respective steps. In order to make the data meaningful for macro-analysis of resource usage, reporting, analysis and modeling, the process data is further grouped according to process names, full command name, user name and account name. This converts detailed process data into resource usage statistics for appropriate workloads or business entities. Capture ratio is also used to correct the workload resource usage statistics.

The following is a simple watt to correct inconsistent and erroneous data. Compare system-wide data and per consumer data. When there is a discrepancy, assume that the system-wide data is more likely to be correct and adjust the per consumer data accordingly. For instance, consider a case in which system-wide data shows that a resource has been used at a 50% rate while the per consumer information implies that it was used at a 40% rate. Assuming that the system-wide data is correct and that the per consumer data is all equally wrong, upward adjust all the per consumer data by 20%. Technically, we say we had a "capture ratio" of 80%; that is, we found at the consumer-level,80% of all the resources reported at the system-wide level.

Figure 7:
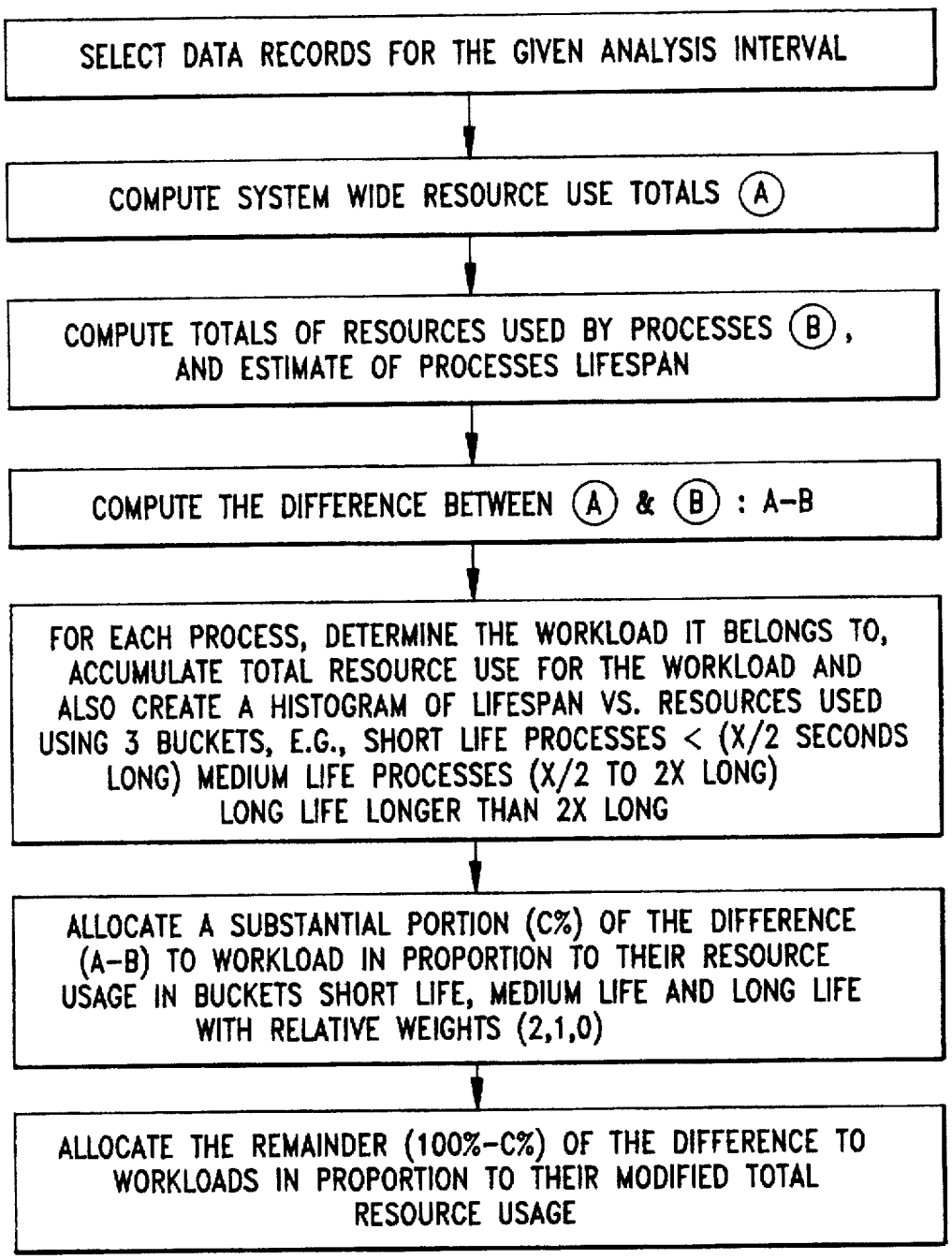
FIG. 7 illustrates further refinements to the basic analysis method to improve the accuracy of the results.

For a next order of improvement in the accuracy of the corrections, we assign the unaccounted-for CPU, A-B, to different processes according to the lifespan of the process. Thus, in FIG. 7, once the differences between the computed systemwide resources total A and the process resource use B and lifespan estimates are determined, a part of the difference is allocated to those workloads containing short-lived processes, and the remainder is allocated to all workloads in proportion to their respective resource usage.

RESOURCE USAGE ANALYSIS OF SUBSYSTEMS, E.G. RDBMS BACKGROUND AND PROBLEM STATEMENT

Figure 8:
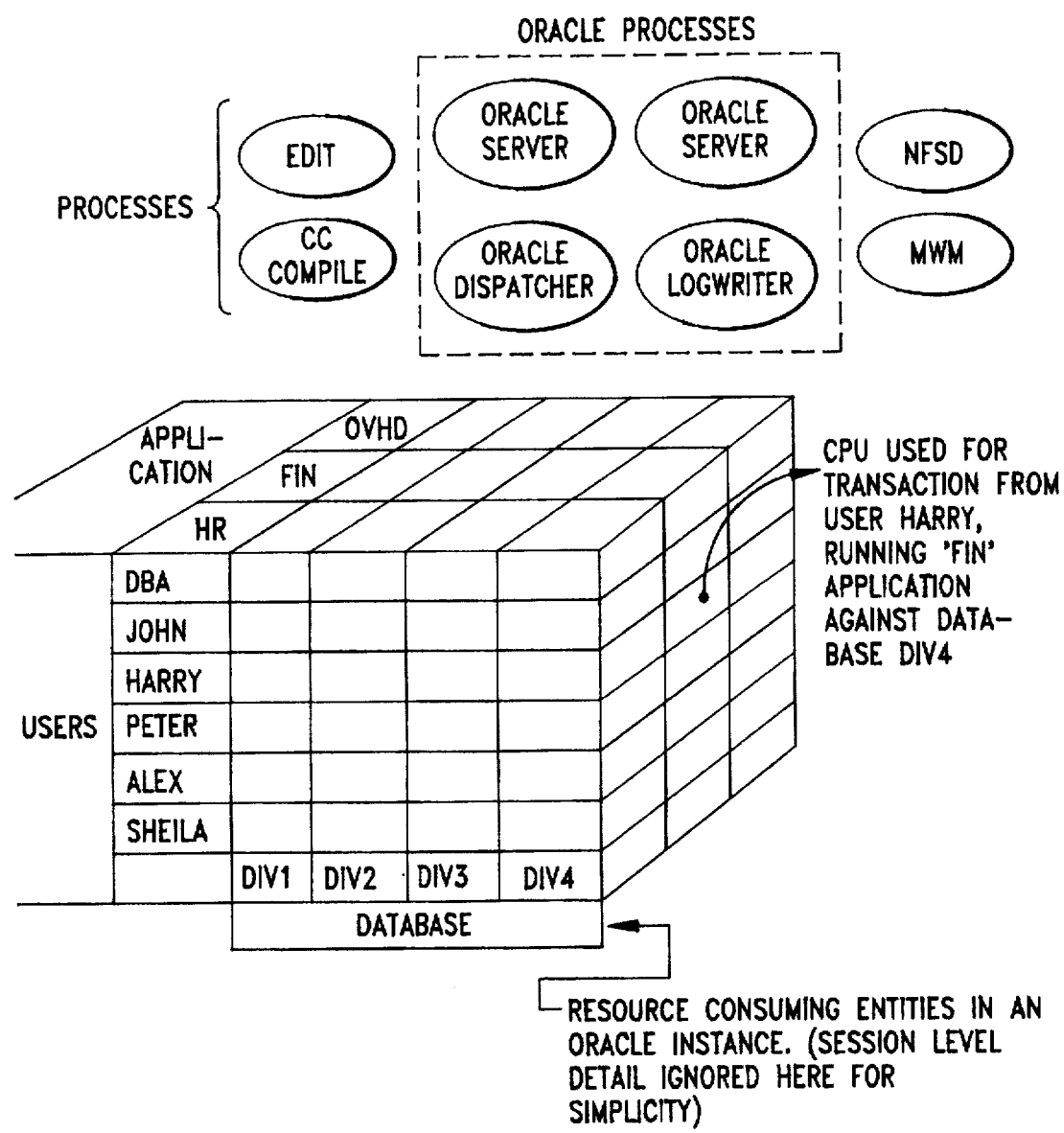
FIG. 8 illustrates UNIX processes, processes on behalf of an Oracic subsystems and the core elements using resources within an Oracle.

Subsystems Such as databases are implemented in UNIX by a set of processes. These products perform work on behalf of transactions or sessions that can be further identified by attributes such as application name, user name and database name. FIG. 8 illustrates a subsystem using the before-mentioned Oracle, a popular relational database management system (RDUMS), as an example. If this figure, each cell in the cube denotes an identifiable entity on whose behalf resources are consumed. A UNIX process may perform work on behalf of several such entities and many UNIX processes may be involved in performing work on behalf of one such entity.

A suitable operating system may, for example, be WindowsNT; and typical subsystem databases, Informix or DB/2 of IBNIM, etc.

Implementationis on UNIX of such subsystems are different from implementation on other systems, such as MVS, in that many operating system level entities (processes) are involved in handling of such subsystems, and the operating system treats each of such processes independently of each other.

While UNIX kernel collects process data, the subsystem collects data about its own activity as well as about the resource usage of its own underlying entities (sessions or transactions). The term "transactions" means potentially a lower level object than a session—where a session may process one or more transactions. Typical transaction monitors include CICS (IBM), TopEnd and Encina.

There are many problems with this data.

The sum of session level activity for all sessions for a user or application does not add Up to the user of application level measurements taken by the subsystem itself.

The sum of user/application level activity for all users or applications within an instance of a subsystem does not add up to the subsystem level measurement taken by the subsystem itself.

The subsystem level measurements taken by the subsystem does not equal the sum of the measurements taken by the UNIX for the processes associated with the subsystem.

The sum of subsystem activity does not add activity that is highly layered. At the lowest level is an individual transaction. Transactions group into sessions. Individual users may have one or more sessions. Also, a session will be associated with a database process. The total activity of a database will be the sum of the activity of the database processes on the system; the database normally being part of a system that includes other types of activity.

In accordance with the invention, these problems are solved as a multiple-step process.

We illustrate this multi-step process by means of showing processing for illustrative subsystems such as Oracle and Sybase.

Figure 9:
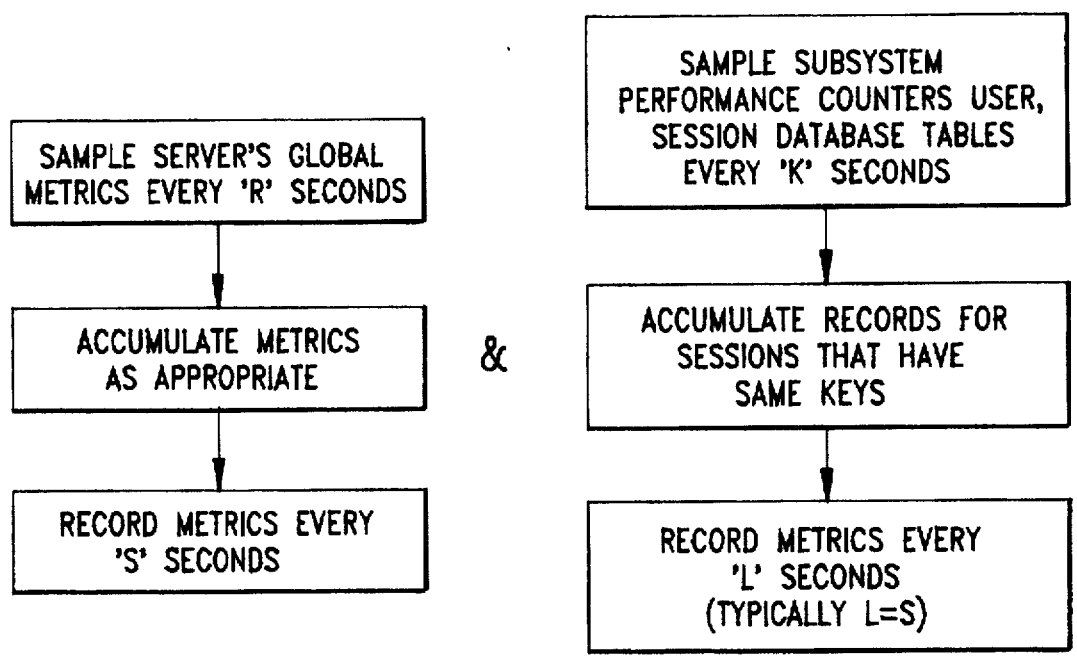
FIG. 9 illustrates the preferred method for collecting data for subsystems, such as the before-mentioned Oracle.

A summary of the steps in measuring the data for subsystems such as Oracle and Sybase is presented in FIG. 9, with the sample server's global metrics sample every R seconds and recorded S seconds, and the subsystem performance counters database tables sampled every K seconds and recorded every L, seconds (generally L, equals S).

For an Oracle system, from Oracle performance tables, we are able to measure the Oracle instance's view of its total CPU utilization and that of its individual sessions. The session level utilization may suffer from significant amounts of sampling errors. If fact, discrepancies exist in aggregates of measurements of related quantities, which would not exist if the measurement techniques were perfect. We resolve these discrepancies by establishing the relative reliability of measurements at different levels—the system-wide CPU utilization measurement being more reliable than UNIX process level CPU utilization measurement The latter is more reliable than Oracle's own measurement of CPU utilization by the Oracle instance which, in turn, is more reliable than Oracle's measurement for individual sessions. FIG. 10 outlines the method of the invention for reconciling the differences in data measured at different levels and analyzing Oracle instance's data with the UNIX level performance data to compute reliable estimates of instance, session and workload utilizations. The first step is shown as adjusting the CPU utilization data for oracle instance level processes, following by finding appropriate subsystem data and then adjusting the subsystem instance level utilization data. Next, as step four, the subsystem session level utilization data is adjusted using instance level utilization data; and then, the overall overhead workload and the subsystem workload utilization are computed.

For Sybase systems, from Sybase instance's performance tables or performance measurement interfaces, we are able to measure Sybase instance's view of its total CPU utilization, and total CPU utilization for individual Sybase users and that of its individual sessions. As in the case of Oracle measurements, the session level utilization may suffer from significant accounts of sampling errors. As before, discrepancies exist as aggregates of measurements or related quantities. We again resolve these discrepancies by establishing the relative reliability of measurements at different levels—in this case, the system-wide CPU utilization measurement being more reliable than UNIX process level CPU utilization measurement. The latter, is more reliable than Sybase's own measurement of CPU utilization by the Sybase instance which, in turn, is more reliable that Sybase's measurement of user CPU utilization which is more reliable than Sybase's measurement for individual sessions. In addition, the relationship between CPU utilization of a Sybase user and its sessions is much stronger than the relationship between the CPU utilization of the whole instance and all of its sessions. The method of the invention takes advantage of the strength of the relationship between different levels of measurements. FIG. 11 outlines this novel method for reconciling the differences in data measured at different levels and analyzing Sybase instance's data with the UNIX level performance data to compute reliable estimates of instance, session and Workload utilizations. This involves adjusting the CPU utilization data for Sybase instance level processes, following by finding appropriate subsystem data and then adjusting the subsystem instance level utilization data. In step four, a preadjustment of the subsystem session level utilization data is made using user level utilization data. The subsystem session level utilization data is then adjusted using the instance level utilization data; and then, the overall overhead workload and the subsystem workload utilization are computed.

The calculation of the totals for utilizations by Database name, Application name or User name can be done using well-known aggregation techniques.

The method has been illustrated above using CPU utilization measurements, but it can readily be applied also to measurement of any other resource, e.g. network packets, disk operations, etc. We have illustrated the method of the invention by using Oracle and Sybase examples. It can also be applied to other subsystems by 1. establishing the relative reliability order of the measurements at different levels,
2. establishing the affinity or the strength of the relationship between any set of levels or measurement, and
3. establishing the method for correcting measurements at each level.

This may be effected using either the "raw measurements" or adjusted measurements for other related level of measurement. Such method may include proportional corrections as well caps and may produce by-products such as estimates of overhead utilizations that represent the subsystem behaviors that are not accounted for directly. The analysis pertains to the data collected for or selected for the same specified interval for both system and subsystem data. Because the system and subsystem data collection processes are not synchronized, the data intervals for the two collectors will generally not match perfectly. This problem is solved by computing the normalizing of all statistics for an interval of the same length.

REVIEW

All computer systems (and many other systems) are built in a series of layers (some real, some conceptual). Sometimes these layers are hierarchically related; at other times, these layers are organized in some overlapping ways.

An analyst is interested in generating statistics about utilization at one or more of these levels. Raw data, generally only an approximation, is available at some, but not all levels. Sometimes, the levels that generate the data are of interest, sometimes not.

The technique of the invention starts by collecting at whatever layer it is available, whether or not it is a layer of likely direct interest. The sum of activity at one layer becomes the initial approximation of activity at the next layer. When data is available at the next layer, a reconciliation must be made. Several possibilities present themselves. If the data at the higher level is considered more reliable, then the data at the lower level will be adjusted (generally proportionately). If the data at the higher level is considered to be less reliable, it may be discarded and the sum of the data at the lower level will be used. Often instead, even though it is not as reliable, it is considered to be approximately correct and thus can be used to place some limits on the lower level data. (For instance, the lower level data is not adjusted, unless the two conflict by more than a certain percentage). Finally, it can happen that both data sources are considered to be equally reliable. Here, if the higher level data exceeds the sum of the lower level data, it is often appropriate to consider the difference to be overhead. If the higher level data is less than the sum of the lower level, then a compromise between the two must be struck.

Another common situation is for data not to be available at an intermediate level, but to be available at both a higher and lower level. For instance, information may not be available about applications, but be available for processes and for the whole computer However, the level of interest may be the application layer. Here, the method is to start by assuming that the intermediate layer used the sum of the resources attributed, found at the lower layer; then it is adjusted as described above.

Whereas, generally, the analysis of systems consisting of different layers of subsystems with their own underlying subsystems have typically dealt with each level independently, the method of the invention provides a unified way for dealing with data at different levels. While the specific implementation has been presented here for the UNIX systems and its RDBMS subsystems, it is obvious that it is also directly applicable to other operating systems, including WindowsNT, OS/2 and subsystems such as SQLserver, Informix, DB/2, etc.

Further modifications will also occur to those skilled in this art and such are considered to fall within the spirit and scope of the invention as defined in the appended claims.

What is claimed is:

1. A method of reducing the errors in the measurements of the usage of resources such as CPU's by computer system processes, for such purposes as performance analysis and planning, that comprises, measuring the resource usage by the operating system processes of the computer system by periodically sampling the CPU(s) to determine whether idle or apparently busy, and if busy, with which process; correction the measurement of resource usage of terminated processes;

measuring the resource usage by one or more process-implemented subsystems of the computer system by periodic sampling; and correlating the measurements taken by the subsystems with those taken by the operating system as corrected.

2. A method as claimed in claim 1 and in which, during the collection of resource usage data, enhancing data collection by recreating data lost between samples.

3. A method as claimed in claim 2 and in which, during each sampling period, the resource usage data is collected from the operating system for each process; and in the event that a process that was running during a previous sampling period is observed no longer to be running, correspondingly to modify the usage data in accordance with earlier usage data.

4. A method as claimed in claim 3 and in which the computer system is implemented as a UNIX system wherein every process has a parent process from which child processes are forked in a tree-like hierarchy, and in which subsystems are implemented by sets of processes.

5. A method as claimed in claim 4 and in which, whenever it is observed in a sampling period that a process that was running during the previous sampling period is terminated, modifying the resource usage in accordance with the usage recorded by the parent process.

6. A method as claimed in claim 5 and in which detailed process data is converted into resource usage statistics correlated with appropriate workloads and user entities, corrected by process capture ratios.

7. A system for reducing the errors in the measurements of the usage of resources by computer system processes, having, in combination with the computer system, periodic sampling measurement means for measuring the resource usage by the computer operating system of the resources;

means for correcting the measuring of resource used by takings into account terminated processes; and means for analyzing the resulting data to provide an improved picture of resource utilization.

8. A system as claimed in claim 7 and in which there is provided means for measuring by periodic sampling the resource usage by one or more process-implemented subsystems of the computer system; and means for correlating the measurements taken by the subsystems with those taken by the operating system.

9. A system as claimed in claim 8 and in which means is provided, operable during the collection of resource usage data, for enhancing data collection by recreating data lost between samples.

10. A system as claimed in claim 9 and in which means is provided for modifying the usage data to account for the terminating of resource usage by a process in a sampling period where that process was operating in a previous sampling period.

11. A system as claimed in claim 9 and in which the computer system operates as a UNIX system with every process having a parent process from which are forked child processes in a tree-like hierarchy, and in which subsystems are implemented by sets of processes.

12. A system as claimed in claim 11 and in which, means is provided, operable in the event that a previously running process is indicated as terminated in a sampling period, for modifying the resource usage measurement in accordance with the usage indicated by the parent process.

13. A system as claimed in claim 12 and in which means is provided for converting detailed process data into resource usage statistics correlated with appropriate workloads and user entities, corrected by process capture ratio.

14. A system as claimed in claim 12 and in which the subsystem is an ORACLE system implemented in the UNIX system.

15. A system as claimed in claim 12 and in which the subsystem is a SYBASE system incorporated in the UNIX system.

16. A method as claimed in claim 4 and in which the subsystem is the ORACLE system and the ORACLE instance view of its total CPU utilization and that of its individual sessions are measured, and discrepancies in the measurements of CPU utilization caused by sampling errors in the session level utilization are resolved by establishing relative reliability of measurements at the different levels of the system-wide CPU utilization measurement, UNIX process level CPU utilization measurement, the ORACLE measuring at the ORACLE instance level, and the ORACLE measurement for individual sessions, with the system-wide CPU utilization measurement being treated as more reliable than the UNIX process level CUP utilization measurement, which is treated as more reliable than the ORACLE instance measurement, and which, in turn, is treated as more reliable than the ORACLE measurement for individual sessions; and reconciling differences in data measured at the different levels; and analyzing the ORACLE instance data with the UNIX level performance data to compute reliable estimates of instance, session and workload utilizations.

17. A method as claimed in claim 4 and in which the subsystem is the SYBASE system and the SYBASE instance view of its total CPU utilization and total CPU utilization for individual SYBASE users and that of its individual sessions are measured, and discrepancies in the measurements of CPU utilization caused by sampling errors in the session level utilization are resolved by establishing relative reliability of measurements at the different levels of the system-wide CPU utilization measurement, the UNIX process level CPU utilization measurement, the SYBASE CPU utilization measurement, by the SYBASE instance level, and the SYBASE measurements for user CPU utilization and for individual sessions, with the system-wide CPU utilization measurement being treated as more reliable than the UNIX process level CPU utilization measurement, which is treated as more reliable than the SYBASE instance measurement, and, which, in turn, is treated as more reliable than the SYBASE measurement of user CPU utilization which is more reliable than the SYBASE individual sessions measurements; and reconciling differences in data measured at the different levels; and analyzing the SYBASE instance data with the UNIX level performance data to compute reliable estimates of instance, session and workload utilizations.

18. A method of reducing the errors in the measurement and computing of resource usage by a series of levels of computer system processes and by the workload and sessions level process-implemented subsystems, that comprises, measuring resource usage data at different levels of the system and subsystem; establishing a relative reliability order of the measurements at the different levels; establishing the affinity or strength of the relationship between any set of levels of measurement; and correspondingly correcting measurements at each level.

19. A method as claimed in claim 18 and in which usage activity data is collected at all levels, with the sum of activity at one level becoming the initial approximation of activity at the next level; and reconciling data at successive levels in accordance with said establishing of relative reliability, thereby providing a unified way for dealing with data at different levels.

20. A method as claimed in claim 19 and in which the measurements are of CPU utilization of the system, the system is UNIX, and the subsystem is one of ORACLE and SYBASE, and in which the reconciling of differences in data measured at the respective different levels involves analyzing the respective instance level data with the UNIX level performance data to compute reliable estimates of instance, session and workload level utilizations.

* * * * *